United States Patent [19]
Zushi et al.

[11] Patent Number: 5,354,348
[45] Date of Patent: Oct. 11, 1994

[54] METHOD FOR PRODUCING SILICA GLASS OPTICAL FIBER WITH CARBON COATING

[75] Inventors: Toshihiro Zushi, Amagasaki; Shigeru Nakahara, Itami; Tetsuya Takeda, Itami; Nobusada Nagae, Itami; Masaaki Morisawa, Itami; Tamotsu Kaide, Amagasaki; Hiroyuki Tanaka, Itami, all of Japan

[73] Assignee: Mitsubish Cable Industries, Ltd., Amagasaki, Japan

[21] Appl. No.: 913,171

[22] Filed: Jul. 14, 1992

[30] Foreign Application Priority Data

| May 12, 1991 | [JP] | Japan | 3-349239 |
| Jul. 15, 1991 | [JP] | Japan | 3-201484 |
| Sep. 12, 1991 | [JP] | Japan | 3-262708 |
| Sep. 12, 1991 | [JP] | Japan | 3-262709 |
| Sep. 25, 1991 | [JP] | Japan | 3-274791 |
| Oct. 8, 1991 | [JP] | Japan | 3-289286 |

[51] Int. Cl.$^5$ ............................................. C03B 37/023
[52] U.S. Cl. ................................ 65/423; 65/60.6; 65/430; 65/435; 118/718; 118/719; 427/166
[58] Field of Search ............. 65/3.11, 3.12, 13, 60.6, 65/3.1; 427/166; 118/718, 719

[56] References Cited

U.S. PATENT DOCUMENTS

| 5,024,688 | 6/1991 | Oohashi et al. | 427/166 X |
| 5,152,817 | 10/1992 | Bennett et al. | 65/3.1 |

FOREIGN PATENT DOCUMENTS

| 0371628 | 6/1990 | European Pat. Off. . |
| 0374926 | 6/1990 | European Pat. Off. . |
| 2-263741 | 10/1990 | Japan . |
| 2-302343 | 12/1990 | Japan . |

Primary Examiner—Robert L. Lindsay
Attorney, Agent, or Firm—Varndell Legal Group

[57] ABSTRACT

A method for producing a silica glass optical fiber, which comprises coating carbon on the optical fiber with the use of the remaining heat of not less than 800° C. possessed by the optical fiber just after heat wire drawing, for thermal decomposition of a carbon coat-forming gas comprised of one or more members selected from the group of halogenated hydrocarbons, hydrocarbons, and halogen molecules, which has 5 to 15 hydrogen atoms per 10 halogen atoms, and a reaction apparatus for coating carbon, wherein the area of the outer end of an exhaust region is greater than the transverse sectional area of a coating region, and the outer end is outwardly opened. The production method and the reaction apparatus therefor of the present invention are advantageous in that the optical fiber thus obtained has superior properties in terms of resistance to water, resistance to hydrogen, and mechanical strength, specifically tensile strength, that sedimentation of the soot component in the reaction apparatus can be prevented, that the flow of the material gas can be made smooth, that a uniform carbon coat can be formed on the surface of the optical fiber, and that long-term operation of carbon coating apparatus can be made possible.

6 Claims, 7 Drawing Sheets

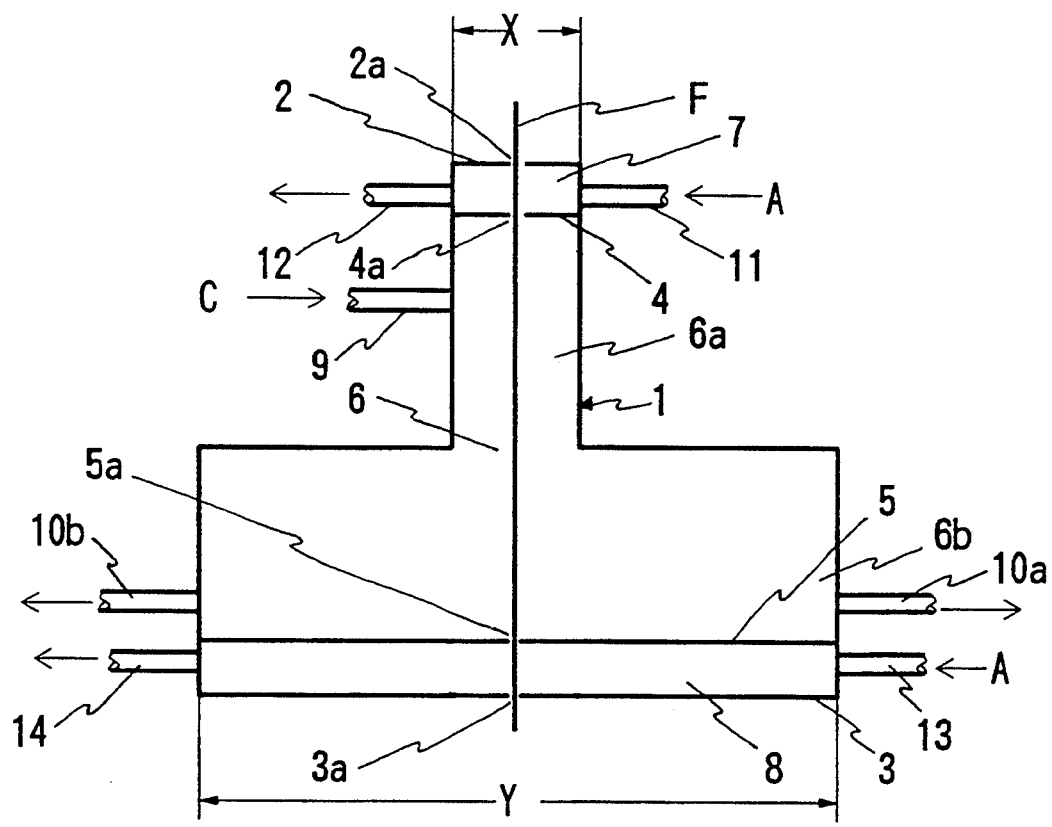

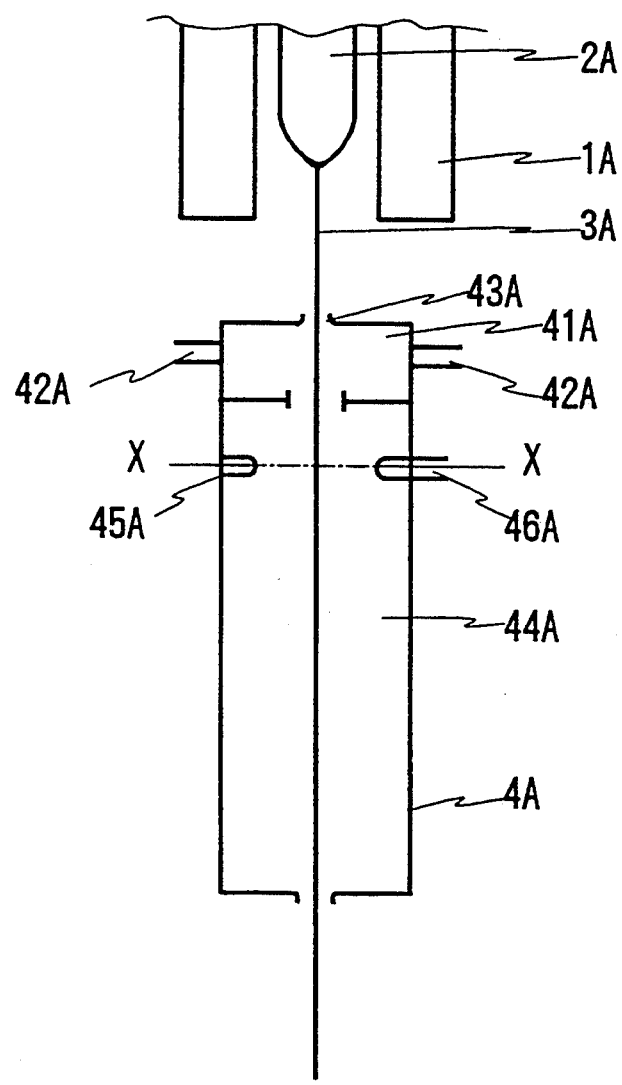

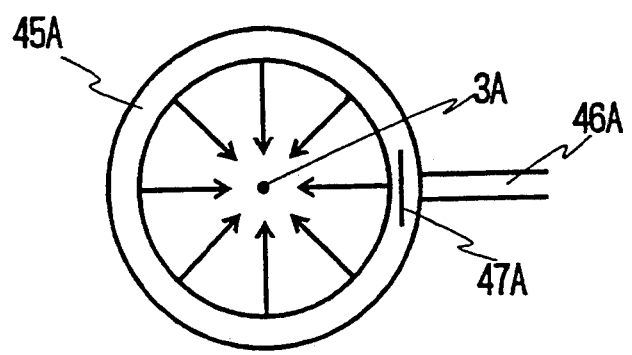

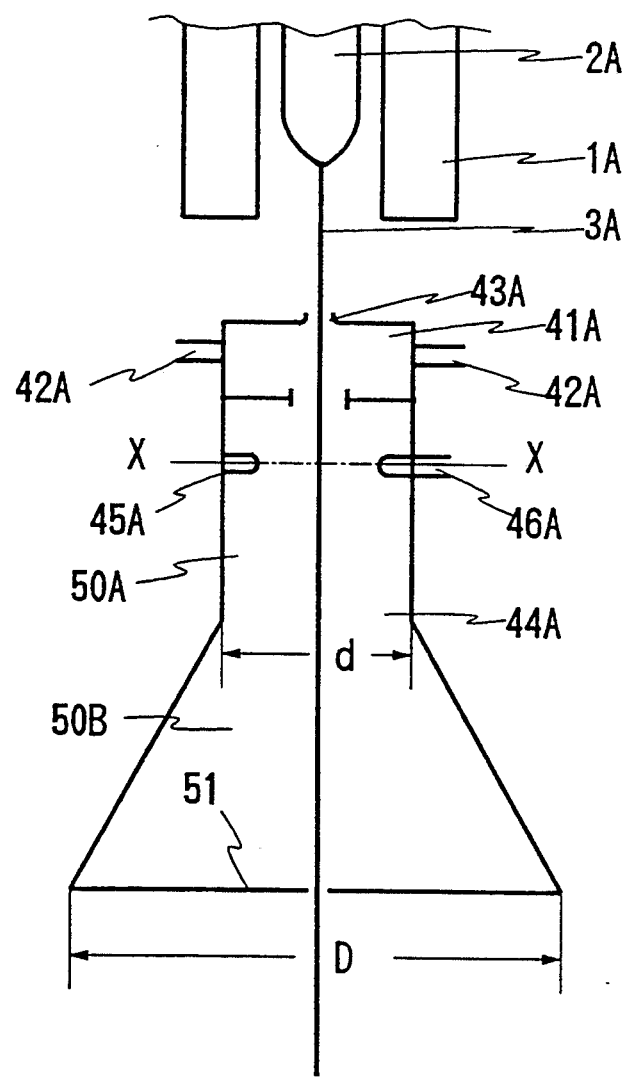

METHOD FOR PRODUCING SILICA GLASS OPTICAL FIBER WITH CARBON COATING

FIELD OF THE INVENTION

The present invention relates to a novel method for producing silica glass optical fiber imparted with resistance to water and resistance to hydrogen by carbon coating, and to a reaction apparatus to be used for the carbon coating.

BACKGROUND OF THE INVENTION

Silica glass optical fiber has a problem in that the transmission loss gradually increases as a result of long-term contact with hydrogen gas or water. The reason therefor is considered to be an absorption loss caused by molecular movement itself of hydrogen molecules diffused in optical fiber, an increase of absorption loss by hydroxy groups produced by the reaction of hydrogen with $B_2O_3$, $P_2O_5$, $GeO_2$, $Na_2O$, etc. contained in optical fiber as dopants, and the like.

In view of the above, there have been so far proposed imparting resistance to water and hydrogen, to optical fiber by forming a carbon film on the surface of optical fiber upon thermal decomposition of hydrocarbon and chlorine-containing hydrocarbon. Nevertheless, a carbon film formed by conventional methods such as a method comprising introduction of a low temperature optical fiber into a high temperature reactor furnace, heating same to a necessary temperature, and thermal decomposition of carbon coat-forming gas; and a method comprising thermal decomposition of carbon coat-forming gas of hydrocarbon, halogenated hydrocarbon, or a mixture of these, wherein the number of hydrogen atom is adjusted to be not less than 20 per 10 halogen atoms, exhibits insufficient water- and hydrogen gas-blocking effect. A carbon coating film of an increased thickness such as to enhance the blocking effect poses another problem of decreased tensile strength of the optical fiber obtained.

In case where a carbon film is industrially formed on the surface of optical fiber, the speed with which a carbon film is formed is not sufficiently fast, and a method for forming carbon film which is industrially more efficient has been desired.

In addition, the present inventors have found that the conventional carbon coat layers are not uniformly applied on fiber, with the result that sufficient water resistance and tensile strength cannot be attained, and that a uniformly applied carbon coat layer can improve these properties.

The conventional reaction apparatuses for carbon coating have a construction wherein carbon coating chamber is not opened. Thus, if a carbon film is formed on the surface of an optical fiber with the use of this reaction apparatus, tile soot component of a thermally decomposed material gas accumulates at the neighbourhood of an exhaust slot of a carbon coating chamber and clogs the slot, whereby a smooth flow of the material gas is prevented, and uniform carbon coating on the optical fiber cannot be achieved. As a result, this carbon coating apparatus permits only 5 to 10 minutes' continuous operation.

SUMMARY OF THE INVENTION

An object of the present invention is to provide a method for producing a carbon-coated silica glass optical fiber improved in resistance to water, resistance to hydrogen, and tensile strength.

Another object of the present invention is to provide an industrially efficient method for producing a carbon-coated silica glass optical fiber improved in resistance to water, resistance to hydrogen and tensile strength.

A still another object of the present invention is to provide a novel method for uniformly forming a carbon coat layer on an optical fiber.

A still further object of the present invention is to provide a carbon coating reaction apparatus which accompanies no sedimentation of the soot component at the vicinity of the entrance to an exhaust tube of a carbon coating chamber, but permits continuous smooth flow of material gas, and uniform carbon coating on an optical fiber; and a method for producing a carbon-coated silica glass optical fiber using said reaction apparatus.

The present inventors have conducted various studies for the purpose of achieving the above-mentioned objects, and found that the thermal decomposition of a specific carbon coat-forming gas comprised of one or more members selected from the group of halogenated hydrocarbons, hydrocarbons, and halogen molecules, which has 5 to 15 hydrogen atoms per 10 halogen atoms, using the remaining heat of not less than 800° C. possessed by the optical fiber immediately after heat wire drawing from preform can result in quick production of a carbon-coated silica glass optical fiber improved in resistance to water, resistance to hydrogen and tensile strength.

The present invention is a method for producing a silica glass optical fiber wherein a carbon coat-forming gas comprised of one or more members selected from the group of halogenated hydrocarbons, hydrocarbons, and halogen molecules (hereinafter sometimes referred to as A component), which has 5 to 15 hydrogen atoms per 10 halogen atoms, is thermally decomposed by the remaining heat of not less than 800° C. possessed by the optical fiber immediately after heat wire drawing from a silica optical fiber preform, to give a carbon-coated optical fiber.

Further, the present invention is a carbon coating reaction apparatus also for use in the embodiment of the production method of the above-mentioned invention, wherein a carbon coating chamber consists of a coating region and an exhaust region, the area of the exhaust region being larger than the transverse sectional area of the coating region, and said outer end being opened to permit discharging of the thermally decomposed material gas from the coating region toward the discharging end of the exhaust region.

Also, the present invention is a method for producing a silica glass optical fiber, which comprises the use of the aforementioned carbon coating reaction apparatus.

BRIEF DESCRIPTION OF THE DRAWINGS

FIG. 4 is a cross sectional view of another embodiment of the carbon coating reaction apparatus of the present invention.

FIG. 5 is a cross sectional view of one embodiment of the apparatus for the production method of the present invention.

FIG. 6 is a cross sectional view of the apparatus taken along line X—X of FIG. 5.

FIG. 7 is a cross sectional view of the one having an open end construction, wherein the outer end diameter of the exhaust region of the apparatus as shown in FIG. 5 is made greater than the diameter of the coating region.

Figure 1:
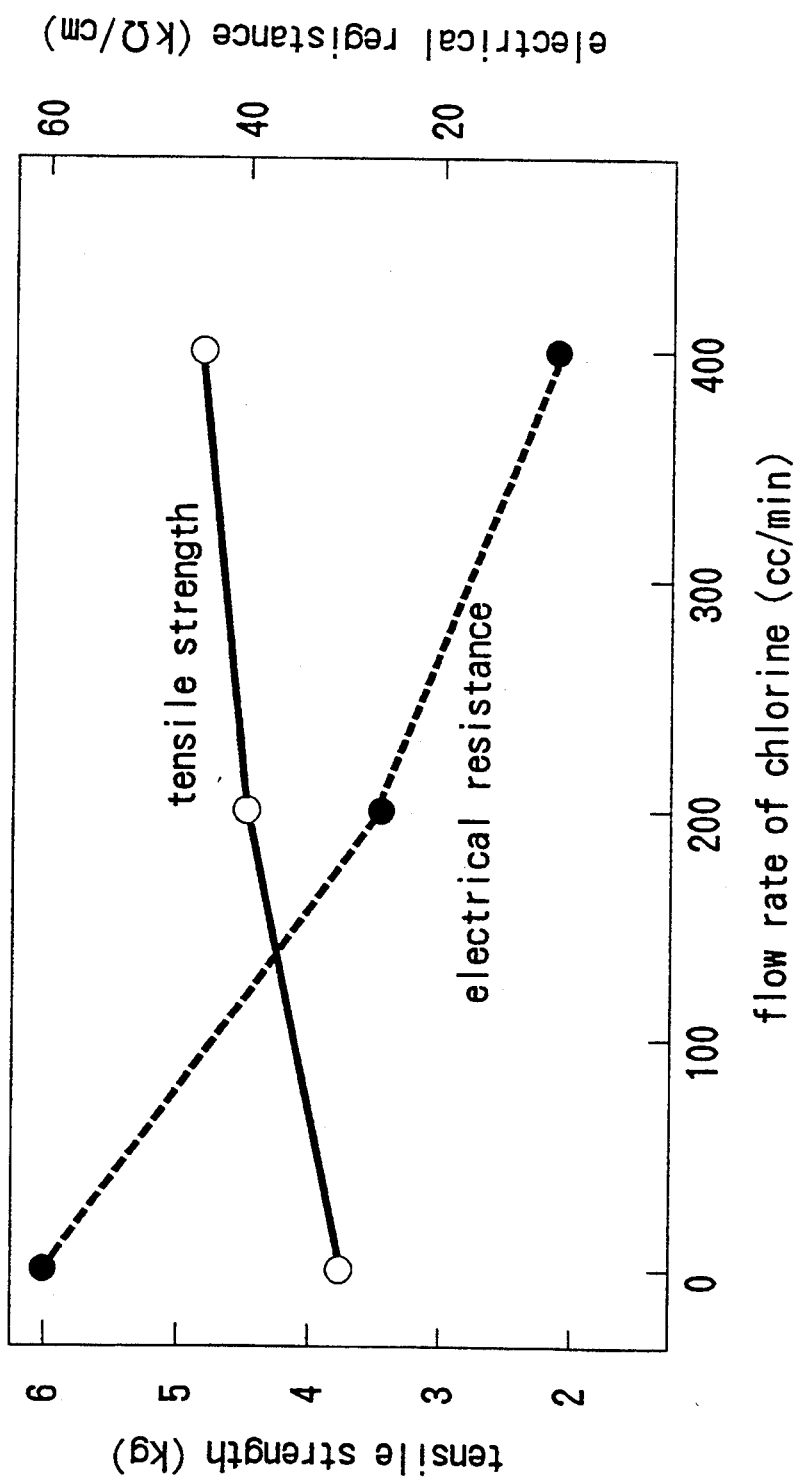
FIG. 1 is a graph showing electrical resistance and tensile strength of a silica glass optical fiber produced by the method of the present invention.

According to the production method for optical fiber of the present invention, a dense carbon coating layer can be formed on the surface of said optical fiber by thermal decomposition of a carbon coat-forming gas having a specific composition, with the use of the remaining heat in a specific temperature range possessed by a silica glass optical fiber, with the result that hydroxy group and silanol group are prohibited from being formed on the surface of the optical fiber, and a carbon-coated optical fiber improved in resistance to water, resistance to hydrogen and mechanical strength, particularly tensile strength, can be obtained quickly.

According to the carbon coating reaction apparatus of the present invention, the thermally decomposed material gas in the coating region can be exhausted toward the discharging end of the exhaust region, giving rise to no sedimentation of soot component inside the carbon coating reaction apparatus.

Moreover, even in case where the outer end of the exhaust region is closed, the material gas flowing from the coating region to the exhaust region is diffused and becomes thin, making the soot component sparsely present, due to the volume of the exhaust region being made greater than that of the coating region. The material gas in this state is forced out from the exhaust slot, and causes no clogging by the sedimentation of the soot component in the exhaust slot.

Consequently, the flow of the material gas thermally decomposed within the carbon coating reaction apparatus becomes smooth, and uniform carbon coating can be applied on the surface of the optical fiber, which in turn permits long-term operation of the carbon coating apparatus.

The carbon coating reaction apparatus of the present invention can be used not only for the embodiment of the present invention but widely for carbon coating.

DETAILED DESCRIPTION OF THE INVENTION

The halogenated hydrocarbon to be used in the present invention includes aliphatic and aromatic hydrocarbons having at least one halogen atom such as chlorine, bromine, etc, with particular preference given to chlorine as the halogen atom.

Examples of the halogenated hydrocarbon include chloromethane, dichloromethane, trichloromethane, carbon tetrachloride, chloroethane, dichloroethane, trichloroethane, tetrachloroethane, propane having 1-5 chlorines, chlorobutane having 1-6 chlorines, chloropentane having 1-7 chlorines, chlorohexane having 1-7 chlorines, chlorocyclohexane having 1-7 chlorines, chloroethylene having 1-4 chlorines, chloropropylene having 1-5 chlorines, chlorobutene having 1-5 chlorines, chloropentene having 1-5 chlorines, various isomers of those having isomers, chlorobenzene having 1-3 chlorines, chlorotoluene, and compounds wherein the chlorine is replaced by bromine.

The hydrocarbon to be used in the present invention includes aliphatic hydrocarbons such as methane, ethane, propane, butane, pentane, hexane, cyclopropane, cyclohexane, ethylene, propylene, butene, pentene, acetylene and various isomers of those having isomers, and aromatic hydrocarbons such as benzene, to toluene and xylene.

In the present invention, halogen molecules include chlorine, bromine, fluorine, etc., with preference given to chlorine.

The carbon coat-forming gas in the present invention has 515, preferably 8-12 , more preferably 9-11 hydrogen atoms per 10 halogen atoms, with the most preference given to those having the same number of the both atoms.

The use of halogenated hydrocarbon solely can also achieve the above-mentioned hydrogen atom/halogen atom ratio, and the preferred halogenated hydrocarbons are dichloromethane, dibromomethane, trichloroethane, tribromoethane, etc.

When two or more halogenated hydrocarbons are combined, exemplified are an equimolar mixture of chloromethane and trichloromethane, a mixture of chloroethane and 150–400 moles of tetrachloroethane per 100 moles of the chloroethane, and so on.

The combination of halogenated hydrocarbon and hydrocarbon includes trichloromethane and acetylene, tetrachloroethane and acetylene, and so on, wherein hydrocarbon is used in a proportion of 1–500 volume parts, preferably 10–300 volume parts, more preferably 50–200 volume parts per 100 volume parts of halogenated hydrocarbon.

The combination of hydrocarbon and halogen molecule is preferably that of ethane, propane, benzene, etc. with chlorine, and the amounts to be combined are exemplarily shown in the following Table 1.

TABLE I

|  | hydrocarbon | | halogen molecule | |
|---|---|---|---|---|
| Example A | $C_2H_6$ | 200 cc/min. | $Cl_2$ | 200 cc/min. |
| Example B | $C_3H_8$ | 200 cc/min. | $Cl_2$ | 800 cc/min. |
| Example C | benzene | 200 cc/min. | $Cl_2$ | 600 cc/min. |

In the present invention, a carbon coat layer is directly formed on the surface of an optical fiber by thermal decomposition of a specific carbon coat-forming gas by a high temperature remaining heat of 800° C. or more possessed by the optical fiber just after the heat wire drawing from an optical fiber preform. The problems of the present invention cannot be solved by a method such as one wherein a low temperature optical fiber is introduced into a high temperature reaction furnace for heating the fiber to a necessary temperature, while at the same time a carbon coat-forming gas is thermally decomposed, instead of the method of the present invention wherein a carbon coat-forming gas is thermally decomposed by the high temperature heat of an optical fiber just after the heat wire drawing, because of the low tensile strength of the optical fiber obtained.

The preform for the silica glass optical fiber is normally heat drawn in a high temperature furnace of not less than 2000° C. In the present invention, a carbon coat layer is formed on the surface of the optical fiber by thermal decomposition of a carbon coat-forming gas with the use of the heat remaining from the wire drawing. The remaining heat here is in the range which allows carbon coat-forming gas to be thermally decomposed. When expressed by the temperature of an optical fiber upon initiation of thermal decomposition of the gas, which is induced by contacting with the optical fiber, it is generally not less than 800° C., and preferably not more than 1900° C., more preferably 1000°–1800° C. In particular, it is preferably a little lower than 1800° C., particularly preferably 1000°–1700° C. from the aspect of resistance to hydrogen. The reason therefor is considered to be that hydrogen gas shielding effect can be improved by fine texture of carbon particles, which is attributable to the relatively gradual progress of thermal decomposition at lower temperatures, as different from the rapid reaction at higher temperatures.

The carbon coat layer can be formed by an appropriate method such as a method wherein a carbon coat forming gas is directly blown onto an optical fiber at a temperature within the range of the above-mentioned remaining heat of the optical fiber after wire drawing, or a method wherein a reaction apparatus for consecutive supply of a carbon coat-forming gas is installed, and an optical fiber is passed through said reaction apparatus, or any other method as long as the object of the invention can be achieved. For retaining the reaction temperature, carbon coating is preferably conducted under the heat reserving conditions using heat resistant reaction apparatus such as those made of silica glass and ceramic.

The amount of the carbon coat-forming gas to be supplied is normally 300–5000 cc/min., preferably 500–3000 cc/min. The carbon coat-forming gas may be diluted with an inert gas such as helium, argon, etc., and the concentration of A component is 30–90 volume %, preferably 50–80 volume % on a diluted gas basis. The carbon coat layer to be formed on the surface of the optical fiber is 300–1000Å, preferably 400–600Å in thickness. While selected as appropriate according to the kind of gas, concentration of gas, etc., the carbon coating gas is thermally decomposed for 0.05–5 sec., preferably 0.05–1 sec., particularly preferably 0.1–0.5 sec.

The aforementioned carbon coating may be repeated to give a coating film of two or more layers.

In the present invention, a white coating layer and a colored coating layer of a desired color are preferably formed on the carbon coat layer, so as to hide the color of the carbon coat layer which is to be a base layer.

Where only a colored coating layer is formed directly on the carbon coat layer, the color of the base carbon coat layer overlies on the color of the colored coating layer, so that the superficial visual hue changes from that of the original colored coating layer. On the other hand, where a white coating layer is formed for shielding the color of the base layer, it covers the color of the carbon coat layer, and the original color of the colored coating layer becomes the superficial color of the fiber.

The white coating layer can be formed by, for example, a method comprising coating a white ink prepared by adding a white color material such as titanium oxide to an ultraviolet curable resin such as urethane acrylate, epoxy acrylate, etc., or a method comprising extrusion coating of a white colorant such as titanium oxide in a base resin such as polyolefines (e.g. polyethylene, etc.) and fluorine resins (e.g. PFA, FEP, ETFE, etc.). The thickness of the white coating layer is suitably about 1–5 $\mu$m, preferably about 2–10 $\mu$m in view of the color hiding effect and increase of the outer diameter of the optical fiber core wire.

Materials conventionally used for core wire identification and conventional manufacture methods can be used for the colored coating layer. Examples thereof include coating of a color material prepared by adding an organic pigment having a desired color to an ultraviolet curable resin such as urethane acrylate and epoxy acrylate. The thickness thereof is preferably about 3–15 $\mu$m.

In general terms, the optical fiber which requires identification is an optical fiber cable containing many optical fibers bundled therein, and the color of each optical fiber significantly facilitates fiber connection by the colors. From this aspect, a structure wherein the color of the base carbon coat layer does not cause visual color change of the surface color of a colored coat layer is specifically advantageous.

The carbon-coated optical fiber thus obtained is normally covered by resin. As the resin, preferred are curable resins, and upon coating by a curable resin liquid coating apparatus, the resin is cured by heat, ultraviolet rays, etc. to give a resin protecting layer.

In the present invention, an optical fiber is preferably passed through a carbon coating reaction apparatus, during which a carbon coat-forming gas is uniformly supplied from all around the entrance to said apparatus, and at the same time the gas is thermally decomposed by the high temperature heat possessed by the optical fiber immediately after heat wire drawing from an optical fiber preform, such as to form a carbon coat layer on the surface of the optical fiber.

Because of the thermal decomposition in the approximately uniform presence of a carbon coat-forming gas surrounding the optical fiber to be carbon-coated, a carbon coat layer approximately uniform in thickness can be formed on the surface of the optical fiber. An exemplary of the apparatus for the embodiment of such production method includes, for example, those shown in FIGS. 5–7 to be described later.

FIG. 5 is a cross sectional view of said apparatus, and FIG. 6 is a cross sectional view of the apparatus taken along line X—X of FIG. 5. FIG. 7 is a cross sectional view of an apparatus having a structure wherein the area of the outer end of the exhaust region of the apparatus of FIG. 5 is made larger than the transverse sectional area of the coating region, with the exhaust region being outwardly opened.

In FIGS. 5 and 6, an optical fiber 3A which has been drawn from a fiber preform 2A in a wire drawing furnace 1A and preferably still retains high temperature heat passes through a cylindrical reaction apparatus 4A for carbon coating, which is placed underneath the wire drawing furnace 1A. The reaction apparatus 4A consists of a prechamber 41A for shutting out the air, and a carbon coating chamber 44A. The prechamber 41A is provided with two gas inlets 42A on both sides, through which an inert gas such as argon or helium is incessantly introduced and exhausted from an optical fiber inlet 43A of the prechamber 41A, such as to shield out the air.

Formed on the inner wall of the entrance to the carbon coating chamber 44A is a gas supplying tube 45A, through which a carbon coat-forming gas introduced from a conduit 46A installed through the wall of the carbon coating chamber 44A is led to the gas supplying tube 45A, and uniformly jetted from numerous holes (not shown) made in said tube 45A, toward the optical fiber 3A passing through the center of the carbon coating chamber 44A, as shown in FIG. 6. A baffle plate 47A is equipped in the gas supplying tube 45A near the outlet of the conduit 46A, such that the gas from the conduit 46A spreads throughout the gas supplying tube 45A as uniformly as possible. While the injection of the carbon coat-forming gas from the gas supplying tube 45A is preferably as uniform as possible, good results can be also obtained by, for example, intensively jetting the gas from 4 or more holes arranged at approximately equal intervals in the gas supplying tube 45A.

A reaction apparatus having the following structure is preferably used for the production method of the present invention. Namely, the carbon coating chamber 44A has a coating region 50A and an exhaust region 50B as shown in FIG. 7, with the difference between the apparatus of FIG. 5 being a diameter D of an outer end 51 of said exhaust region 50B, which is greater than a diameter d of said coating region 50A, while this outer end 51 being outwardly opened, thereby enabling discharging of a thermally decomposed material gas in the coating region 50A toward the exhaust region 50B and to the discharging end.

This carbon coating reaction apparatus preferably have a structure such that the outer end of the exhaust region is closed, while at least one exhaust tube is installed on the side thereof, such as to exhaust the thermally decomposed material gas in the exhaust region to the outside.

According to this carbon coating chamber 44A, the thermally decomposed material gas in the coating region 50A is exhausted toward the discharging end of the exhaust region 50B, whereby avoiding sedimentation of the soot component within the carbon coating chamber 44A.

Even with the structure of the outer end portion 51 of the exhaust region 50B being closed, since the volume of the exhaust region 50B has been made greater than that of the coating region 50A, the material gas flowing from the coating region 50A to the exhaust region 50B can be diffused in this exhaust region 50B, resulting in a sparsely present soot component. Forcing out of the diffused material gas to the outside from an exhaust tube (not shown) does not cause clogging by the sedimentation of the soot component in the exhaust tube.

This results in smooth flow of the material gas thermally decomposed within the carbon coating chamber 44A, which in turn enables uniform carbon coating on the surface of the optical fiber 3A and long-term operation of the carbon coating apparatus.

A carbon coating reaction apparatus having the following structure is preferably used for the production method of the present invention. Namely, the carbon coating chamber consists of a coating region and an exhaust region, wherein the area of the outer end of said exhaust region is made greater than the transverse sectional area of said coating region, while this outer end is outwardly opened, thereby enabling discharging of a thermally decomposed material gas in the coating region toward the exhaust region and to the discharging end.

An embodiment of said carbon coating reaction apparatus is described hereafter by illustrating the attached drawings.

Figure 2:
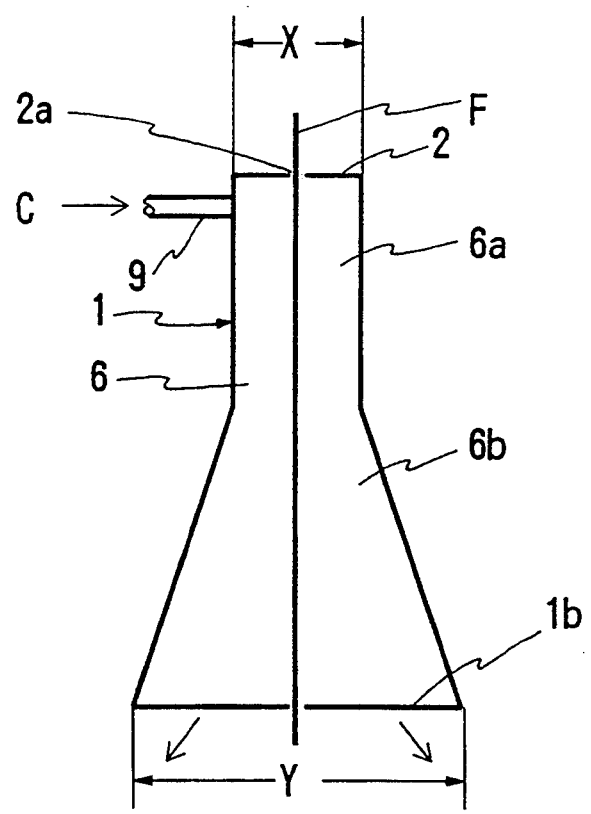
FIG. 2 is a cross sectional view of one embodiment of the carbon coating reaction apparatus of the present invention.

FIG. 2 is a cross sectional view of one embodiment of this carbon coating reaction apparatus. Said carbon coating reaction apparatus is used in combination with the wire drawing furnace similar to those shown in FIGS. 5 and 7, as a carbon coating apparatus.

In FIG. 2, 1 is a carbon coating reaction apparatus made of silica glass, which comprises a carbon coating chamber 6. The carbon coating chamber 6 consists of, for example, a cylindrical coating region 6a and, for example, a trumpet-shaped exhaust region 6b. An outer end portion 1b of the exhaust region 6b has a diameter Y greater than a diameter X of the aforementioned coating region 6a, and is outwardly opened.

On the upper side of the coating region 6a is an inlet tube 9, from which a material gas C (e.g. propane at a flow rate of 200 cc/min. and chlorine gas at a flow rate of 200 cc/min.) is continuously supplied to the carbon coating chamber 6. The carbon coating chamber 6 in the above reaction apparatus 1 is heated to 1400° C., for example, by a heater (not shown), and the material gas C supplied is thermally decomposed here.

The above-mentioned carbon coating reaction apparatus 1 can be fabricated from materials having resistance to heating at high temperatures, such as metals (e.g. stainless steel)and ceramics (e.g. silicon nitride), besides the aforementioned silica glass.

The structure mentioned earlier prevents the soot component of the material gas C from accumulating inside the carbon coating reaction apparatus 1, since the material gas C in the coating region 6a smoothly flows to the discharging end of the outer end portion 1b of the exhaust region 6b and is exhausted to the outside. Since the optical fiber F passes through a smooth flow of the material gas C, a uniform carbon coating can be formed on the surface of the fiber, while enabling long-term operation of carbon coating apparatuses.

Figure 3:
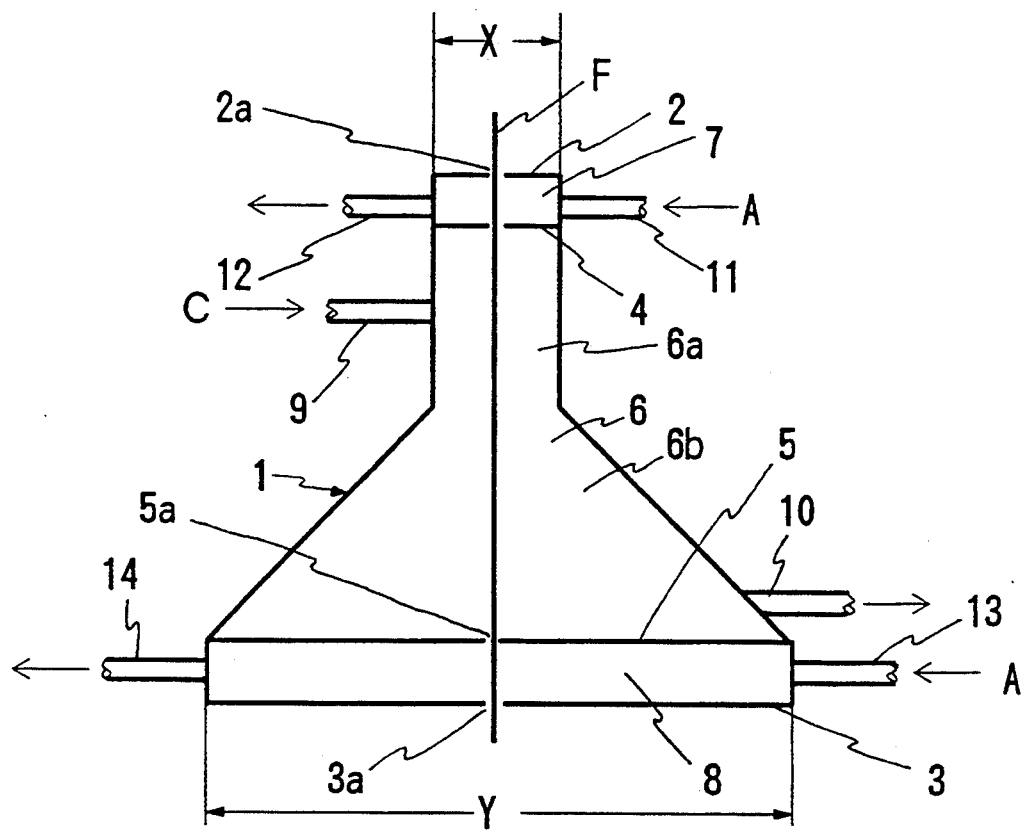
FIG. 3 is a cross sectional view of another embodiment of the carbon coating reaction apparatus of the present invention.

FIG. 3 is a cross sectional view of another embodiment of this carbon coating reaction apparatus. The components corresponding to those in FIG. 2 are identified with the same reference signs, and detailed description thereof will be omitted.

In this figure, what is different from the apparatus of the aforementioned FIG. 2 is that an outer end 3 of the carbon coating reaction apparatus 1 is closed, partition parts 4, 5 are formed inside to make a carbon coating chamber 6 and sealing rooms 7 and 8, and that an exhaust slot 10 for exhausting gas by an exhaust forcing means (not shown) is formed on the downward side of the exhaust region 6b of the carbon coating chamber 6. In addition, on the side of the sealing rooms 7 and 8 are inlet tubes 11, 13 and lead-through tubes 12, 14, such as to seal the material gas C in the carbon coating chamber 6 by supplying argon gas into said sealing rooms 7 and 8. In the figure, 5a and 3a are apertures for passing an optical fiber, and A is an inert gas to be introduced into the sealing room.

According to the aforementioned construction wherein the volume of the exhaust region 6b of the carbon coating chamber 6 is made greater than that of the coating region 6a, the material gas C flowing from the coating region 6a to the exhaust region 6b is diluted in this exhaust region 6b so that the soot component becomes thin. Since the material gas C in this state is forced out from the exhaust slot 10, clogging by the soot component accumulated in the exhaust slot 10 can be avoided.

Absence of sedimentation of the soot component inside the carbon coating reaction apparatus 1 permits smooth flow of the material gas C, which in turn affords a uniform carbon coating on the surface of the optical fiber F formed by the material gas C decomposed in the carbon coating chamber 6. Also, the soot component does not clog in the exhaust slot 10, and long-term operation of a carbon coating apparatus becomes attainable.

FIG. 4 is a cross sectional view of another embodiment of this carbon coating reaction apparatus. The components corresponding to those in FIG. 3 are identified with the same reference signs, and detailed description thereof will be omitted.

In this figure, what is different from the apparatus of FIG. 3 is that the exhaust region 6b is of a cylindrical shape with the diameter Y being about 10 times the diameter X of the coating region 6a, which is formed concentrically with the coating region 6a, and that two exhaust slots 10a and 10b are formed in the exhaust region 6b.

This structure permits no sedimentation of the soot component in the exhaust slots 10a and 10b with the help of the effective discharging of the rarefied material gas C in the exhaust region 6b from plural exhaust slots 10a and 10b to the outside.

In the above-mentioned embodiments, the carbon coating reaction apparatus is of an Erlenmeyer flask shape, an Erlenmeyer flask shape with an open bottom, or a double structure cylindrical shape. In addition to these, it may be of a flask shape, a double structure prismatic shape, a gourd shape, etc.

Combined with a wire drawing furnace, etc., said reaction apparatus can be used as a carbon coating apparatus.

EXAMPLES

The present invention is hereinbelow explained in more detail by referring to examples, to which the present invention is not limited.

Comparative Example 1, Examples 1–5

An optical fiber of 125 μm outer diameter was drawn in a wire drawing furnace from an optical fiber preform of a B and F doped silica glass cladding layer on a Ge doped silica glass core, at 2200° C. and drawing speed of 250 m/min. Immediately thereafter, the obtained optical fiber was consecutively passed through a 1 m-long carbon coating reaction apparatus made of silica glass which was installed beneath the wire drawing furnace to give a carbon coating on the surface of the optical fiber. A gas supplying means was provided at the entrance of said reaction apparatus, from which a mixed gas of dichloromethane and argon was continuously supplied into the reaction apparatus for carbon coating. Finally, the carbon-coated optical fiber was treated with an ultraviolet curable resin by a conventional method to form a protecting layer. The temperature of the optical fiber at the entrance of the reaction apparatus around the installed position of the gas supplying means, supplied amounts of dichloromethane and argon, and various physical properties of the optical fiber obtained are summarized in Table 2. The temperature (T) of the optical fiber was adjusted by changing the installed position of the reaction apparatus from the wire drawing furnace, and the temperature was calculated by the following formula (I) which is well known.

$$T = T_0 + (T_1 - T_0) \exp(-4 hz/\rho CdV) \quad (I)$$

T: temperature of fiber at the measurement point
$T_0$: outside air temperature
$T_1$: temperature of fiber immediately after wire drawing (at the drawing position)
h: heat conductivity
z: distance from the drawing position
$\rho$: fiber density
C: specific heat of fiber
d: diameter of fiber
V: linear speed Of the physical properties of the optical fiber, tensile strength was measured at the distortion speed of 5%/min. per 10 m of a sample; electrical resistance was determined by measuring the average electrical resistance of the carbon coat per unit length using an ohmmeter; water resistance was measured by the tensile strength of the optical fiber after 200 hours' immersion in pure water at 80° C.; and resistance to hydrogen was determined by leaving a 1000 m-long optical fiber sample in a hydrogen atmosphere under 3 atmospheric pressure (gage pressure) for 300 hours, and measuring increase of loss at wavelength of 1.24 μm before and after the immersion, the results of which are shown in Table 2.

TABLE 2

|  | Comp. Ex. 1 | Example 1 | 2 | 3 | 4 | 5 |
| --- | --- | --- | --- | --- | --- | --- |
| dichloromethane supply (cc/min) | — | 600 | 600 | 600 | 600 | 600 |
| argon supply (cc/min) | — | 600 | 600 | 600 | 600 | 600 |
| temperature of optical fiber (°C.) | — | 1410 | 1480 | 1550 | 1630 | 1720 |
| electrical resistance (kΩ/cm) | ∞ | 21 | 16 | 13 | 13 | 11 |
| tensile strength (kg) | 4.0 | 6.1 | 6.2 | 6.2 | 6.2 | 6.1 |
| water resistance (tensile strength after immersion in water, kg) | 3.0 | 6.1 | 6.1 | 6.1 | 6.2 | 6.0 |
| resistance to hydrogen (increase of loss, dB/km) | 6.11 | 0.10 | 0.61 | 1.19 | 1.83 | 1.99 |

Comparative Example 2, Examples 6–10

Drawing, carbon coating and resin coating were conducted in the same manner as in Example 1 except the use of a mixed gas of dichloromethane, acetylene and argon in place of the mixed gas of dichloromethane and argon, to give an optical fiber. The supply amount of each gas, temperature of the optical fiber, and physical properties of the optical fiber are shown in Table 3.

TABLE 3

|  | Comp. Ex. 2 | Example 6 | 7 | 8 | 9 | 10 |
| --- | --- | --- | --- | --- | --- | --- |
| dichloromethane supply (cc/min) | — | 600 | 600 | 600 | 2900 | 2900 |
| acetylene supply (cc/min) | 100 | 100 | 200 | 300 | 100 | 100 |
| argon supply (cc/min) | 600 | 600 | 600 | 600 | 600 | 600 |
| temperature of optical fiber (°C.) | 1410 | 1410 | 1410 | 1410 | 1410 | 1630 |
| electrical resistance (kΩ/cm) | 32 | 9.2 | 8.1 | 5.8 | 10 | 5.4 |
| tensile strength (kg) | 3.8 | 6.1 | 6.2 | 6.0 | 6.2 | 6.0 |
| water resistance (tensile strength | 3.1 | 6.0 | 6.2 | 6.0 | 6.1 | 6.0 |

TABLE 3-continued

| | Comp. Ex. 2 | Example 6 | 7 | 8 | 9 | 10 |
|---|---|---|---|---|---|---|
| after immersion in water, kg) | | | | | | |
| resistance to hydrogen (increase of loss, dB/km) | 5.42 | 0.10 | 0.10 | 0.12 | 0.11 | 0.09 |

Examples 11–16

Drawing, carbon coating and resin coating were conducted in the same manner as in Example 1 except the use of dichloromethane in place of the mixed gas of dichloromethane and argon, to give an optical fiber. The supply amount of dichloromethane, temperature of the optical fiber, and physical properties of the optical fiber obtained are shown in Table 4.

TABLE 4

| | Example 11 | 12 | 13 | 14 | 15 | 16 |
|---|---|---|---|---|---|---|
| dichloromethane supply (cc/min) | 400 | 300 | 300 | 300 | 300 | 300 |
| temperature of optical fiber (°C.) | 1410 | 1410 | 1480 | 1550 | 1630 | 1720 |
| electrical resistance (kΩ/cm) | 10 | 12 | 11 | 9 | 9 | 8 |
| tensile strength (kg) | 6.1 | 6.2 | 6.2 | 6.1 | 6.1 | 6.2 |
| water resistance (tensile strength after immersion in water, kg) | 6.2 | 6.2 | 6.1 | 6.2 | 6.1 | 6.1 |
| resistance to hydrogen (increase of loss, dB/km) | 0.09 | 0.08 | 0.55 | 1.05 | 1.60 | 1.68 |

Comparative Example 3, Examples 17–18

An optical fiber of 125 μm outer diameter was drawn in a wire drawing furnace from an optical fiber preform of a B and F doped silica glass cladding layer on a Ge doped silica glass core, at 2200° C. and a drawing speed of 350 m/min. Immediately thereafter, the obtained optical fiber was consecutively passed through a 1 m-long carbon coating reaction apparatus made of silica glass, which was placed underneath the wire drawing furnace to give a carbon coating on the surface of the optical fiber. A gas supplying means was provided at the entrance of said reaction apparatus, from which propane was continuously supplied into the reaction apparatus for carbon coating at a flow rate of 200 cc/min., and chlorine gas at flow rates of 0 cc/min. (Comparative Example 3), 200 cc/min. (Example 17), and 400 cc/min. (Example 18). The reaction temperature was 1400° C. Finally, the carbon-coated optical fiber was coated with an ultraviolet curable resin by a conventional method to form a protecting layer.

The thus-obtained carbon-coated silica glass optical fiber was examined for the thickness of the carbon layer by the measurement of electrical resistance, and tensile strength, the results of which are shown in FIG. 1.

Of the physical properties of the optical fiber, tensile strength was measured at a distortion rate of 5%/min. for 20 samples of 10 meters long, and electrical resistance was estimated by measuring average electrical resistance of the carbon coat per unit length by an ohmmeter.

Examples 19–21

An apparatus comprising a carbon coating reaction apparatus made of silica glass, and having a structure shown in FIG. 7 was prepared. The reaction apparatus had a 3 cm-long prechamber, into which argon gas was incessantly introduced from two gas inlet tubes at a flow rate of 200 cc/min. and exhausted from the optical fiber inlet in said chamber. The carbon coating chamber located next to the prechamber had an inner diameter of cm, and a length of 1 m, and a gas supplying tube having gas jetting holes punched through at equal intervals was provided in the inner wall of the entrance.

An optical fiber of 125 μm outer diameter was drawn in a wire drawing furnace from an optical fiber preform of a B and F doped silica glass cladding layer on a Ge doped silica glass core, at 2200° C. and drawing speed of 250 m/min, and passed through the above-mentioned reaction apparatus made of silica glass. Various carbon coat-forming gases were consecutively supplied from a gas supplying tube for carbon coating on the surface of the optical fiber. Then, the carbon-coated optical fiber was coated with an ultraviolet curable resin by a conventional method to form a protecting layer.

The temperature of the optical fiber when passing through the reaction apparatus, the kind and amount of carbon coat forming gas used, and physical properties of the optical fiber obtained are shown in Table 5. The temperature of the optical fiber was adjusted by changing the installed position of the reaction apparatus from the wire drawing furnace.

The physical properties of the optical fiber as shown in Table 5 were measured under the conditions and methods given below.

The temperature (T) of the optical fiber when passing through the reaction apparatus, tensile strength, electrical resistance, water resistance, and resistance to hydrogen were measured in the same manner as described above. Thickness of carbon coat layer: An optical fiber was embedded with epoxy resin, and sliced with a diamond cutter to give samples for fiber cross section observation. The maximum thickness and the minimum thickness of the samples were measured by transmission electron microscope, and the difference between them was calculated.

Comparative Examples 4–5

An optical fiber was produced in the same manner as in Example 19 except that the carbon coat-forming gas was intensively supplied into a carbon coating apparatus from the entrance of the apparatus solely instead of the gas supplying tube used in Example 19, etc., the results of which are shown in Table 5.

TABLE 5

| | | Example 19 | 20 | 21 | Comp. Ex. 4 | 5 |
|---|---|---|---|---|---|---|
| production conditions | dichloromethane supply (cc/min) | 300 | 300 | 300 | 300 | 300 |
| | argon supply (cc/min) | 300 | 300 | 300 | 300 | 300 |
| | temperature of optical fiber (°C.) | 1400 | 1500 | 1600 | 1400 | 1500 |
| physical properties of | thickness of carbon coat layer (μm) maximum | 600 | 610 | 580 | 720 | 700 |
| | minimum | 540 | 550 | 540 | 280 | 320 |
| | difference | 60 | 60 | 40 | 440 | 380 |
| | electrical resistance (kΩ/cm) | 10.8 | 11.5 | 11.0 | 10.0 | 11.8 |

TABLE 5-continued

|  |  | Example | | | Comp. Ex. | |
|---|---|---|---|---|---|---|
|  |  | 19 | 20 | 21 | 4 | 5 |
| optical fiber | tensile strength (kg) | 6.1 | 6.2 | 6.1 | 6.1 | 6.1 |
|  | water resistance (tensile strength after immersion in water, kg) | 6.0 | 6.2 | 6.2 | 6.2 | 6.2 |
|  | resistance to hydrogen (increase of loss, dB/km) | 0.11 | 0.52 | 0.89 | 2.00 | 1.95 |

Examples 22–24, Comparative Examples 6–7

Drawing, carbon coating and resin coating were conducted in the same manner as in Example 19, Comparative Example 4, etc. except the use of a mixed gas of dichloromethane, acetylene and argon in place of the mixed gas of dichloromethane and argon, to give an optical fiber. The supply amount of each gas, temperature of the optical fiber when passing through the reaction apparatus, and physical properties of the optical fiber obtained are shown in Table 6.

TABLE 6

|  |  | Example | | | Comp. Ex. | |
|---|---|---|---|---|---|---|
|  |  | 22 | 23 | 24 | 6 | 7 |
| production conditions | dichloromethane supply (cc/min) | 300 | 300 | 300 | 300 | 300 |
|  | acetylene supply (cc/min) | 100 | 100 | 100 | 100 | 100 |
|  | argon supply (cc/min) | 300 | 300 | 300 | 300 | 300 |
|  | temperature of optical fiber (°C.) | 1400 | 1500 | 1600 | 1400 | 1500 |
| physical properties of optical fiber | thickness of carbon coat layer (μm) maximum | 630 | 620 | 600 | 720 | 690 |
|  | minimum | 590 | 600 | 570 | 300 | 330 |
|  | difference | 40 | 20 | 30 | 420 | 360 |
|  | electrical resistance (kΩ/cm) | 11.5 | 12.0 | 12.3 | 11.8 | 13.5 |
|  | tensile strength (kg) | 6.3 | 6.1 | 6.2 | 6.2 | 6.3 |
|  | water resistance (tensile strength after immersion in water, kg) | 6.2 | 6.1 | 6.1 | 6.2 | 6.2 |
|  | resistance to hydrogen (increase of loss, dB/km) | 0.13 | 0.61 | 1.93 | 2.11 | 2.08 |

Reference Example 1

The carbon-coated optical fiber of each Example was coated with a white ink prepared by adding titanium oxide as a white colorant to urethane acrylate to form a 4 μm-thick white coating layer on the carbon coat layer, over which a colored ink added with either one of red, blue, yellow, green, pink, brown and white coloring pigments, was coated to give a 6 μm-thick colored coating layer. There were obtained 7 different colors of optical fiber core wires.

According to the production method of the present invention, the use of the remaining heat of not less than 800° C. just after wire drawing, for thermal decomposition of a carbon coat-forming gas having a specific composition results in the use of no special heating furnace, whereby making production of optical fiber economical. In addition, the optical fiber thus obtained has superior properties in terms of resistance to water, resistance to hydrogen, and mechanical strength, specifically tensile strength, and can be suitably used for various kinds of optical communications.

According to the present invention, an optical fiber having superior, improved properties in terms of resistance to water, resistance to hydrogen, and mechanical strength, specifically tensile strength, can be obtained.

By using the carbon coating reaction apparatus as defined by the present invention, there can be achieved advantageous features in that sedimentation of the soot component in the reaction apparatus can be prevented, the flow of the material gas can be made smooth, uniform carbon coating can be given on the surface of the optical fiber, and long-term operation of the carbon coating apparatus is obtainable.

What is claimed is:

1. A method for producing a silica glass optical fiber, which comprises:
   contacting an optical fiber immediately after heat drawing thereof from an optical fiber preform having a temperature of between 800° C. and 1900° C. with a carbon coat-forming gas; said carbon coat-forming gas containing dichloromethane, and
   thermally decomposing said carbon coat-forming gas and forming a carbon layer on said optical fiber having a temperature of between 800° C. and 1900° C. only by use of heat contained in said optical fiber.

2. A production method according to claim 1, wherein the heat drawing of the optical fiber is carried out at a speed of between 250 and 350 m/minute.

3. A production method according to claim 1, wherein the temperature of the heat drawn optical fiber is in the range of between 1000° C. and 1700° C.

4. A production method according to claim 1, wherein the carbon coating is conducted using the carbon coat-forming gas and an inert gas, wherein concentration of the carbon coat forming gas is 30–90 volume % on a diluted gas basis.

5. A production method according to claim 1, wherein the carbon coat layer is formed on a surface of the optical fiber by passing the optical fiber through a carbon coating reaction apparatus, and supplying the carbon coat-forming gas approximately uniformly from all around an entrance to the carbon coating reaction apparatus, while at the same time allowing the thermal decomposition to occur.

6. A production method according to claim 1, wherein the optical fiber is introduced into a carbon coating reaction apparatus comprising a carbon coating chamber consisting of a coating region and an exhaust region, and an area of an outer end of the exhaust region is greater than a transverse sectional area of the coating region, and the outer end opens outwardly, thereby enabling discharge of the thermally decomposed carbon coat-forming gas from the coating region toward the exhaust region, and from a discharging end of the exhaust region to outside of the carbon coating reaction apparatus.

* * * * *